Figure 1:
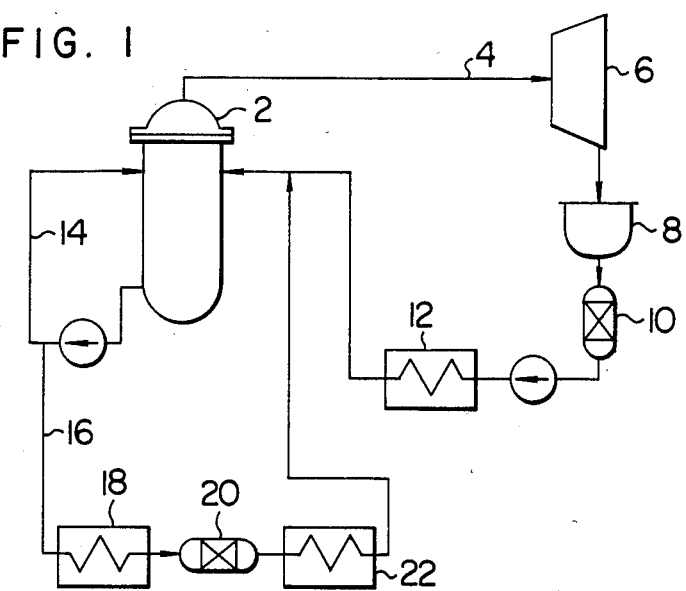

United States Patent [19]

Kawamura et al.

[11] Patent Number: 4,587,232
[45] Date of Patent: May 6, 1986

[54] INORGANIC ADSORBENT AND PROCESS FOR PRODUCTION THEREOF

[75] Inventors: Fumio Kawamura; Makoto Kikuchi, both of Hitachi; Kiyomi Funabashi, Katsuta, all of Japan

[73] Assignee: Hitachi, Ltd., Tokyo, Japan

[21] Appl. No.: 536,872

[22] Filed: Sep. 29, 1983

[30] Foreign Application Priority Data

Oct. 1, 1982 [JP] Japan .................... 57-170831

[51] Int. Cl.$^4$ ............... B01J 21/06; C01G 23/08
[52] U.S. Cl. ................................ 502/400; 502/439
[58] Field of Search ................. 502/350, 400, 439

[56] References Cited

U.S. PATENT DOCUMENTS

| | | | |
|---|---|---|---|
| 2,961,399 | 11/1960 | Alberti | 502/400 |
| 3,256,339 | 6/1966 | Cole et al. | 502/350 |
| 3,642,912 | 2/1972 | Sharp et al. | 502/350 |

Primary Examiner—Howard S. Williams
Attorney, Agent, or Firm—Antonelli, Terry & Wands

[57] ABSTRACT

An inorganic adsorbent comprising a porous titanium metal and titanium oxide sintered and impregnated on the surfaces of micropores of the porous titanium metal can be produced by impregnating the porous titanium metal with a titanium alkoxide solution, followed by hydrolysis and oxidation to give titanium oxide, and can be used for selectively removing transition metal ions in a water coolant of nuclear reactor.

16 Claims, 6 Drawing Figures

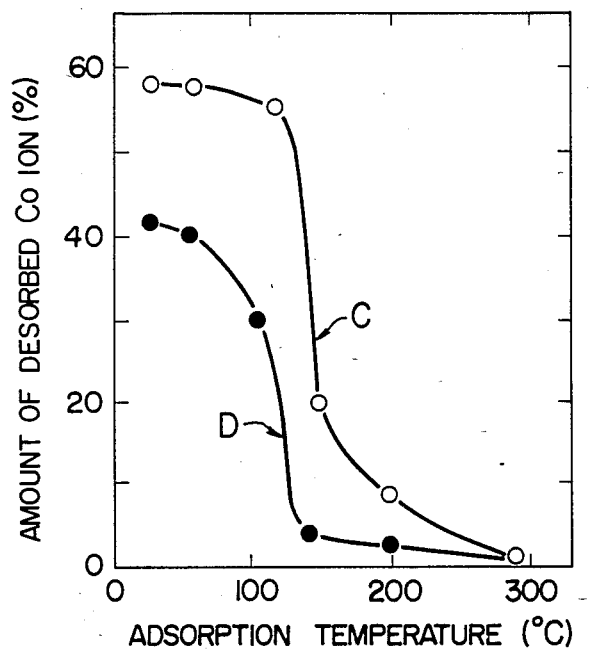

INORGANIC ADSORBENT AND PROCESS FOR PRODUCTION THEREOF

This invention relates to an inorganic adsorbent for high temperature water, a process for producing the same and a process for using the same. More particularly, this invention relates to an inorganic adsorbent for adsorbing metal ions in high temperature water used as reactor water in nuclear power plants without lowering the temperature of the high temperature water greatly, a process for producing the adsorbent and a process for using the adsorbent.

Necessity for adsorbing inorganic ions in the high temperature water is illustrated by referring to a reactor water clean-up system in nuclear power plants. In the reactor water for nuclear reactor in nuclear power plants, there are produced various radionuclides of iron, manganese, cobalt, etc. ($^{59}$Fe, $^{54}$Mn, $^{58}$Co, $^{60}$Co, etc.) by the operation of the nuclear reactor. These radionuclides cause many problems in that they deposit on the insides of pipes of the primary cooling system of the nuclear reactor to increase a dose rate of pipe surface, which results in causing exposure of a human body to irradiation at the time of routine inspection for the nuclear reactor. Among these radionuclides, one which contributes to the radiation dose rate at the greatest rate is $^{60}$Co. $^{60}$Co has a long half-life (5.3 years) and high γ-ray energies (1.17 MeV and 1.33 MeV). Therefore, removal of the primary radio-nuclide $^{60}$Co from the reactor water (water coolant) is a remarkably important problem for reducing the radiation level.

A general boiling water type nuclear power plant is described with reference to FIG. 1. Steam generated in a nuclear reactor 2 is transported to a steam turbine 6 through a major steam pipe 4 and is used for producing electricity. After the steam becomes a condensate by a condenser 8, impurities in the form of ions and crud are removed in a condensate demineralizer 10, heated in a feed-water heater 12 and returned to the nuclear reactor 2. On the other hand, the water coolant in the nuclear reactor 2 is taken out of a lower portion of the reactor and returned to an upper portion of the reactor through pipe 14 to form a recirculation line. A part of the water coolant in the recirculation pipe 14 is taken out through a pipe 16 and cooled to 50° C. to 60° C. from about 280° C. by a heat exchanger 18. The cooled water coolant is heated again to the reactor coolant temperature at a heat exchanger 22 after removing impurities in the form of ions and crud by a reactor water demineralizer 20, and returned to the nuclear reactor 2. A reactor water clean-up system is formed by the pipe 16, the heat exchanger 18 for cooling, the demineralizer 20 and the heat exchanger 22 for heating.

The reactor water demineralizer 20 used in this reactor water clean-up system is packed with an iron exchange resin, which removes impurities in the form of ions and crud while passing the water coolant through the ion exchange resin bed. But since the heat resistant temperature of the ion exchange resin is about 60° C., the water coolant at high temperatures cannot be passed through the ion exchange resin as it is. Thus, the water coolant is cooled to 50° C. to 60° C. by the heat exchanger 18 as shown in FIG. 1 and then again heated to the reactor coolant temperature by the heat exchanger 22. In the case of the boiling water nuclear reactor, the reactor coolant temperature is about 280° C., and in the case of the pressurized water nuclear reactor the reactor coolant temperature is about 340° C. As mentioned above, since the demineralization of water coolant by the use of ion exchange resin requires heat exchangers, the plant system becomes complicated and heat loss becomes large.

Under such circumstances as mentioned above, to develope an adsorbent which can remove impurities such as $^{60}$Co under high temperatures and high pressure is an important problem for achieving the production of electricity with reduced radioactivity and lesser heat loss in the future. In order to solve such a problem, inorganic adsorbents made of mainly metal oxides have been studied.

Inorganic adsorbents are generaly superior to organic ones in heat resistance, radiation resistance, etc. When these inorganic adsorbents are used for demineralizing the water coolant in nuclear power plants, the requirements for evaluating their performance are adsorbing properties of cobalt, stability in high-temperature water and difficulty in neutron activation when a part of adsorbent is brought into a nuclear reactor. Among these requirements, the stability in high temperature water can be evaluated by a solubility rate of adsorbent in high-temperature water. On the other hand, the difficulty in neutron activation of adsorbent can be evaluated by a cross-sectional area of neutron activation reaction and a half-life of produced radionuclide. Table 1 shows the results of evaluations of these requirements on magnetite ($Fe_3O_4$), zirconium oxide ($ZrO_2$), niobium oxide ($Nb_2O_5$), silica ($SiO_2$) and titanium oxide ($TiO_2$).

TABLE 1

| Adsorbent | Co adsorption capacity* (meq/g) | Stability in high temp. water (releasing rate, wt %/day) | Difficulty in neutron activation [half-life of produced rationuclide, cross-sectional area (σ) (barn)] |
|---|---|---|---|
| $Fe_3O_4$ | 0.02 | 0.03 | $^{59}$Fe (45d.), σ = 1.1 |
| $ZrO_2$ | 0.01 | <0.01 | $^{95}$Zr (64d.), σ = 0.08 |
| $Nb_2O_5$ | 0.1 | <0.01 | $^{94}$Nb (1.8 × 10$^4$y.) σ = 1.1 |
| $SiO_2$ | 0.1 | 1 | $^{31}$Si (2.6 hr), σ = 0.11 |
| $TiO_2$ | 0.1 | <0.03 | $^{51}$Ti (5.9 min), σ = 0.14 |

Note
*Reagent (particle size 1–100 μm)

From the results shown in Table 1, titanium oxide is most promising since it shows good evaluation results on all the three requirements. Further, titanium oxide has a property to selectively adsorb cobalt at high temperatures.

Thus, there have been proposed several adsorbents using titanium oxide. For example, a titanium oxide powder alone is granulated and sintered at 800° C. for 6 hours to give an adsorbent with high strength. But since the specific surface area of the adsorbent becomes small and the cobalt adsorption capacity becomes very small, the adsorbent cannot be used practically.

In order to improve such defects, there is proposed sintering of titanium oxide on surfaces of a carrier having a large specific surface area. For example, Japanese Patent Appln Kokai (Laid-Open) No. 40692/82 discloses an adsorbent produced by using as carrier porous alumina and impregnating titanium oxide on surfaces of said alumina. More in detail, said adsorbent is produced by adding titanium isopropoxide and aluminum isopropoxide to water, respectively, at normal temperatures to effect hydrolysis, washing with water, heating at 300° C. to 400° C. to effect oxidation, pulverizing the oxidized product by a ball mill to a size of 140 mesh pass, mixing and pressing the pulverized product, granulating and heating at 500° C. for 6 hours in air. According to this process, the specific surface area can be larger but the compressive strength becomes remarkably small. In this case, γ-alumina (γ-Al$_2$O$_3$) which has a large specific surface area and excellent heat resistance is used as carrier, but γ-Al$_2$O$_3$ changes to γ-AlOOH in high temperature water as shown the following equation:

$$\gamma\text{-Al}_2\text{O}_3 + \text{H}_2\text{O} \rightarrow 2\gamma\text{-AlOOH} \quad (1)$$

Since the resulting γ-AlOOH is remarkably small in strength, it is found that the adsorbent is destroyed at the reactor water temperature of a boiling water nuclear reactor.

On the other hand, Japanese Patent Appln. Kokai (Laid-Open) No. 65188/79 discloses an adsorbent produced by heating porous titanium metal such as sponge titanium at 500° C. under an oxygen atmosphere, followed by heating at 660° C. to 880° C. under a non-oxygen atmosphere to form titanium oxide on the surfaces of titanium metal. Since the titanium oxide formed on the surfaces of titanium metal is formed by heating the titanium metal to oxidize the surface portion titanium of the titanium metal, the surface state of the titanium metal changes to a relatively smooth surface, which results in making the specific surface area small.

Objects of this invention are to improve the disadvantages of the prior art techniques mentioned above and to provide an inorganic adsorbent which can remove transition metals such as cobalt from high temperature water such as a water coolant of a nuclear reactor selectively and efficiently, a process for producing the adsorbent, and a process for using the adsorbent.

This invention provides an inorganic adsorbent comprising a porous titanium metal and titanium oxide sintered and impregnated on the surfaces of micropores of said porous titanium metal.

This invention further provides a process for producing an inorganic adsorbent which comprises a step of impregnating a porous titanium metal with a titanium alkoxide solution to attach and hold the titanium alkoxide on micropores of the porous titanium metal, a step of hydrolysis of the titanium alkoxide attached and held on the above-mentioned micropores to give hydrous titanium oxide, and a step of changing the hydrous titanium oxide to titanium oxide by heating the porous titanium metal holding the hydrous titanium oxide and at the same time sintering and impregnating the above-mentioned titanium oxide on the surfaces of micropores of porous titanium metal.

This invention still further provides a process for using an inorganic adsorbent comprising a porous titanium metal and titanium oxide sintered and impregnated on the surfaces of micropores of the porous titanium metal for removing transition metal ions in a water coolant of a nuclear reactor.

Figure 2:
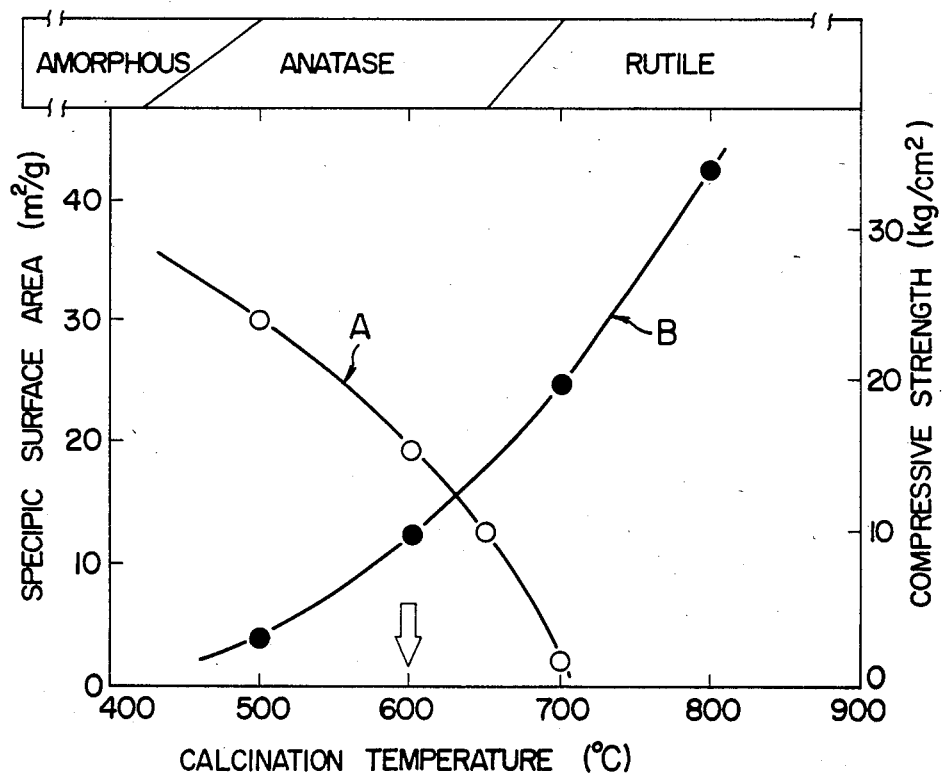
Figure 3:
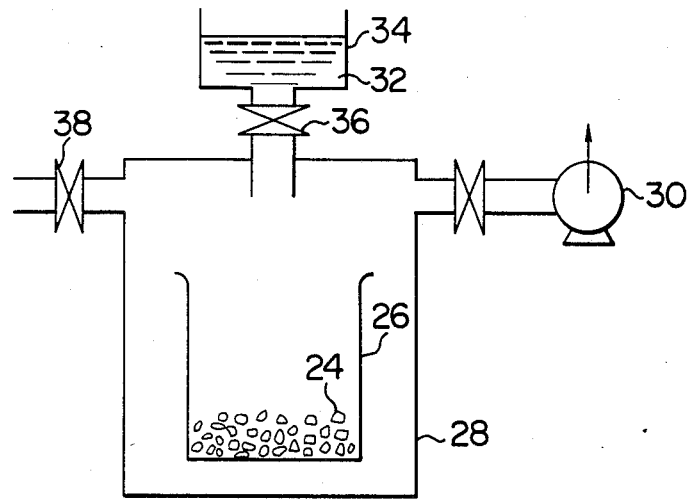
Figure 4:
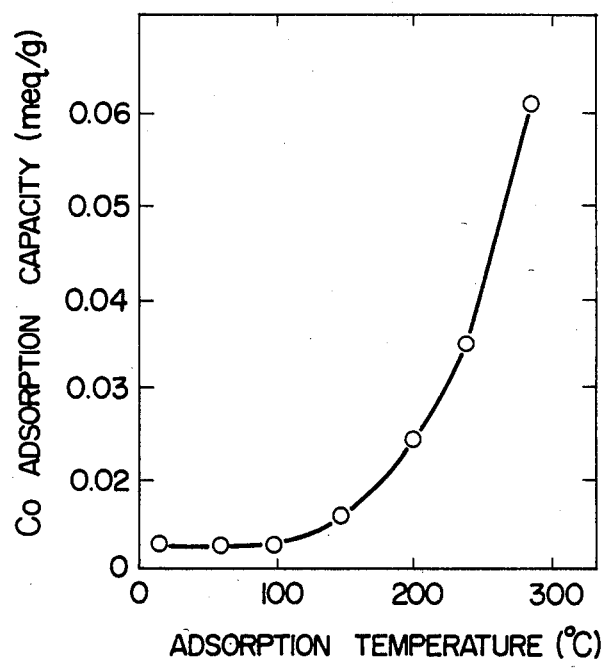

In the attached drawings, FIG. 1 is a flow sheet showing a general boiling water nuclear power plant: FIG. 2 is a graph showing changes of specific surface area and compressive strength with the temperature change of TiO$_2$: FIG. 3 is a diagram explaining one embodiment of a process for producing the adsorbent of this invention: FIG. 4 is a graph showing the temperature dependency of the cobalt adsorption capacity of the adsorbent of this invention: FIG. 5 is a graph showing the adsorption temperature dependency of cobalt desorption rate at normal temperatures of the adsorbent which adsorbed cobalt: and FIG. 6 is a graph showing the ion selectivity of the adsorbent of this invention.

The inorganic adsorbent of this invention is characterized by using as carrier a porous titanium metal and sintering and impregnating titanium oxide produced from a titanium compound other than a compound of the porous titanium metal carrier on micropores of the porous titanium metal.

As the carrier, there is used a porous titanium metal which has large mechanical strength even in high temperature water, is excellent in corrosion resistance and has a large surface area for carrier. As the porous titanium metal, there can be used so-called sponge titanium, or other materials having a large number of micropores on the surfaces thereof.

As the starting material for producing titanium oxide on micropores of the carrier, it is necessary to use compounds having properties suitable for easily impregnating into the micropores of porous titanium metal in the form of a solution. But such compounds as titanium tetrachloride (TiCl$_4$) and titanium sulfate (Ti(SO$_4$)$_2$) are salts of strong acid, so that when these compounds are contained in the adsorbent, they will dissolve in the water coolant to produce chlorine ions and sulfate ions which cause corrosion of the pipes and the reactor core material; this is not desirable. Therefore, it is preferable that the starting materials do not retain chlorine ions, sulfate ions and the like corrosive ions for the adsorbent and are excellent in impregnating into the micropores of porous titanium metal in the form of a solution. Most preferable examples of such starting materials are titanium alkoxides represented by the formula:

$$\text{Ti(OR)}_n$$

wherein R is a lower (preferably C$_1$–C$_6$) alkyl group such as a methyl group (CH$_3$), an ethyl group (C$_2$H$_5$), etc., and n is an integer of 2 or more. Examples of titanium alkoxides are titanium methoxide, titanium ethoxide, titanium butoxide, titanium isopropoxide, titanium tetraisopropoxide, etc. Among them, Ti(OR)$_4$, particularly titanium tetraisopropoxide (Ti(OC$_3$H$_7$)$_4$) is more preferable.

When a solution of titanium alkoxide such as titanium tetraisopropoxide is impregnated into the porous titanium metal, the titanium alkoxide (titanium tetraisopropoxide) is attached and held on the micropores of the porous titanium metal. In order to improve impregnation into the micropores, it is preferable to place the porous titanium metal in a vessel, from which the air is removed to make a vacuum and the air in the micropores is also removed to make a negative pressure. The titanium tetraisopropoxide attached and held on the porous titanium metal is hydrolyzed to form hydrous titanium oxide. The hydrolysis is preferably conducted under a vapor atmosphere of water vapor or ammonia vapor in order to accelerate the hydrolysis. The hydrolysis is preferably conducted at 70° C. to 80° C. In the case of contacting ammonia vapor with the impregnated porous titanium metal at 70° C. to 80° C., there takes place the following hydrolysis reaction:

$$\text{Ti(OC}_3\text{H}_7)_4 + \text{NH}_4\text{OH} \rightarrow \text{Ti(OH)}_4 + \text{NH}_3\text{C}_3\text{H}_8 \quad (2)$$

In the next place, when the porous titanium metal attaching and holding hydrous titanium oxide on the surfaces of micropores is heated at 500° C. to 700° C., the hydrous titanium oxide is changed to titanium oxide by the reaction shown by the following equation and at the same time the titanium oxide is sintered and impregnated on the contacting micropores.

$$Ti(OH)_4 \rightarrow TiO_2 + H_2O \qquad (3)$$

The above-mentioned two reactions, that is, the reaction of the hydrous titanium oxide to titanium oxide and the reaction of sintering and impregnating of the titanium oxide on the micropores, seem to be carried out continuously and to be proceeded simultaneously at parts of the micropores.

At the time of sintering, the calcination temperature may be in the range of 400° C. to 900° C. On the other hand, the specific surface area ($m^2/g$) and compressive strength ($kg/cm^2$) of titainium oxide change depending on calcination temperature as shown in FIG. 2. In FIG. 2, the specific surface area is shown by the curve A and the compressive strength by the curve B. According to the results shown in FIG. 2, with an increase of the calcination temperature, the compressive strength increases but the specific surface area decreases, and at the same time the crystal structure of titanium oxide changes to the rutile form, so that selective adsorption properties for cobalt are lowered. On the other hand, when the calcination temperature is low, the specific surface area increases and the crystal structure of titanium oxide changes to the anatase form, so that selective adsorption properties for cobalt are improved but the compressive strength is lowered. There is a contrasting relationship between the specific surface area and the compressive strength as mentioned above. In order to show performance of adsorbent, particularly as adsorbent for directly removing metal ions from the high temperature water coolant used in nuclear reactor, and taking the compressive strength, specific surface area and adsorption properties of the adsorbent into consideration, the calcination temperature is preferably 500° C. to 700° C., more preferably 550° C. to 650° C.

The adsorbent of this invention carrying in an amount of about 5 to 10% by weight of titanium oxide on porous titanium can easily be produced as mentioned above. Needless to say, the more the amount of sintered and impregnated titanium oxide becomes, the more effective the adsorbent becomes.

This invention is explained in more detail by the following working examples.

An example is explained referring to FIG. 3. Sponge titanium having a specific surface area of about 1 $m^2/g$ (purity 99.5% or more, 10–16 mesh) is washed with water and washed with acetone to remove fats and oils attached to the sponge titanium. This degreasing treatment is effective for making easy the carrying of titanium oxide on the surfaces of titanium metal at the time of sintering. Thereafter, the treated sponge titanium is dried at 120° C. for about 4 hours. The thus treated sponge titanium 24 in an amount of 100 g is placed in a beaker 26 shown in FIG. 3, and the beaker 26 is placed in a vacuum vessel 28 and sealed. Then, the air in the vacuum vessel 28 is evacuated by a vacuum pump 30 to make the pressure in the vacuum vessel about 20 mmHg. By this, the air in the micropores of porous titanium 24 is removed and a negative pressure state is obtained. Then, a cock 36 of a vessel 34 containing a titanium tetraisopropoxide solution 32 is opened to pour the titanium tetraisoproxide solution 32 into the beaker 26 so as to sink the sponge titanium 24 completely in the solution. After immersing the sponge titanium 24 in the titanium tetraisopropoxide solution for about 2 hours, a reef cock 38 is opened to make the pressure in the vacuum vessel 28 atmospheric pressure, followed by allowing to stand for several hours. By this treatment, the micropores of sponge titanium 24 are impregnated with the titanium tetraisopropoxide.

After removing excess titanium tetraisoproxide solution from the micropores of sponge titanium, the sponge titanium is placed in a metal net vessel. On the other hand, 2 liters of ammonia water is prepared by mixing ammonia and water (1:1 by volume) and heated to 70° C. to 80° C. The ammonia vapor generated from the ammonia water is led to the metal net vessel, wherein the sponge metal impregnated with the titanium tetraisopropoxide is exposed to the ammonia vapor atmosphere for 6 hours for fumigation. By the fumigation treatment, titanium tetraisopropoxide is hydrolyzed as shown by the chemical reaction equation (2) to give hydrous titanium oxide represented by the formula: $Ti(OH)_4$.

By repeating the above-mentioned impregnation treatment and fumigation treatment 2 or more times, the hydrous titanium oxide can be carried on the surfaces of micropores of sponge titanium. Even this hydrous titanium oxide has a function of adsorbing metal ions, and thus a material carrying hydrous titanium oxide on a suitable carrier can be used as adsorbent. But in the case of using hydrous titanium oxide, there are many problems in that hydrous titanium oxide is easily decomposed chemically, there is a fear of contaminating a treating solution with the decomposed components, it is difficult to completely carry hydrous titanium oxide on the surfaces of micropores of sponge titanium, etc. Thus, the above-mentioned problems are solved by this invention by sintering the hydrous titanium oxide as explained below.

That is, the sponge titanium impregnated with hydrous titanium oxide is heated at about 600° C. for 6 hours in a heating furnace. By this heat treatment, the hydrous titanium oxide changes to titanium oxide ($TiO_2$) and at the same time the titanium oxide is sintered on the surfaces of micropores of sponge titanium.

Finally, the resulting product is washed with water of 10 times by volume several times and dried to give the desired adsorbent. The adsorbent thus produced carrys titanium oxide in an amount of about 10% by weight.

The use of the thus produced adsorbent for removing metal ions by packing it in the demineralizer 20 shown in FIG. 1 in the clean-up system for the reactor water of nuclear reactor is explained below. FIG. 4 is a graph showing temperature dependency of cobalt adsorption capacity (meq/g) of the adsorbent of this invention in the case of removing cobalt from the water of boiling water nuclear reactor. According to the results shown in FIG. 4, the cobalt adsorption capacity at 285° C., which temperature is the reactor water conditions for boiling water nuclear reactor, is 0.05 meq/g which is about 20 times as large as that at normal temperatures. This means that the adsorbent of this invention has remarkably excellent adsorption ability as one used at high temperatures.

Another performance of the adsorbent of this invention, that is, difficulty in desorbing the adsorbed cobalt into the water coolant again, is examined and shown in FIG. 5. In FIG. 5, the adsorption temperature of cobalt, that is, the temperature of treated solution is taken along the abscissa and the amount of desorbed cobalt (% by weight) from the adsorbent when the temperature of adsorbent at which temperature cobalt is adsorbed is lowered to normal temperatures (20° C.) is taken along the ordinate. The curve C shows the amount of desorbed cobalt into 1N HCl solution, and the curve D shows it into pure water. According to FIG. 5, when the adsorbent adsorbs cobalt at 285° C. which is the water coolant temperature of boiling water nuclear reactor, the desorption of cobalt from the adsorbent at normal temperatures into pure water is 1% by weight or less, which value is negligible. The same thing can be said in the case of the desorbed amount into 1N HCl solution. The reason why the Co desorbed amount into pure water is compared with that into 1N HCl solution is that since the cobalt adsorbed is easily desorbed into an acidic solution, the Co desorbing rate into the hydrochloric acid solution can be regarded as maximum desorbing rates as expected. Taking the above-mentioned things into consideration, even if the temperature is lowered, for example, even if the water coolant temperature is lowered by the stoppage of nuclear reactor, desorption of the adsorbed cobalt can be regarded as negligible.

Selectivity of metal ions other than cobalt by the adsorbent of this invention is examined and shown in FIG. 6. FIG. 6 shows influences of co-existing ions on the ratio of adsorbed amount of cobalt at 285° C. and pH 4.0. According to the results shown in FIG. 6, when ions of transition metals such as nickel (Ni), Copper (Cu), Zinc (Zn), etc. are present together with cobalt ions, the selectivity is lowered remarkably compared with the case of co-existing ions of alkali and alkaline earth metals such as calcium (Ca), lithium (Li), etc., and both ions, e.g. Co and Ni, Co and Cu, or Co and Zn are adsorbed at almost the same degree. This means that when various metal ions are present, almost all the transition metal ions can be adsorbed by the adsorbent of this invention, and the adsorption capacity for transition metal ions is about 20 times as large as that for alkali metal and alkaline earth metal ions. Thus, the adsorbent of this invention has an ability for selectively adsorbing transition metal ions which cause problems as metal ions present in the water coolant of nuclear reactor, and is most suitable as adsorbent for the water coolant of nuclear reactor.

Further, when the adsorbent prepared by the process of this invention is packed in a packing column of 42 mm in diameter and 1000 mm in length to the length of about 800 mm and an aqueous solution of a mixture of cobalt nitrate, ferric nitrate and manganese sulfate in concentration of 10 mg/l., respectively, labelled by $^{54}Mn$, $^{59}Fe$, $^{58}Co$, $^{60}Co$ (each upto $10^{-2}$ μc/ml) is caused to flow through the column at a flow rate of 10 l/min, these radionuclides are adsorbed. The decontamination factors for $^{58}Co$ and $^{60}Co$ are 1000 or more and those for $^{59}Fe$ and $^{54}Mn$ are 500 or more.

Comparison of properties between the inorganic adsorbent of this invention obtained by sintering titanium oxide on porous titanium metal and a conventional adsorbent is made after immersing the two in water at 285° C. for one week and shown in Table 2. As is clear from Table 2, in the case of granulating and sintering $TiO_2$ alone and in the case of forming $TiO_2$ by oxidation on the surface of base material of titanium metal from the base material, the compressive strength is large but the Co adsorption capacity and the specific surface area are small. Further, the adsorbent obtained by impregnated $TiO_2$ on alumina carrier is large in the Co adsorption capacity and the specific surface area but is small in the compressive strength and causes a problem that the adsorbent is mixed into a demineralized water chemically or physically when used for demineralizing the water coolant of nuclear reactor. In contrast, the adsorbent of this invention has sufficient performance for satisfying the Co adsorption capacity, specific surface area and compressive strength.

TABLE 2

| | | Characteristics | | |
|---|---|---|---|---|
| Adsorbent | Producing process | Co adsorption capacity (meq/g) | Specific surface area (m²/g) | Compressive strength (g/cm²) |
| $TiO_2$ (alone) | $Ti(OC_3H_7)_4$ is hydrolyzed with $NH_4OH$ vapor, followed by granulation and sintering (800° C., 6 hr). | 0.01 | 1 | 1000 |
| Ti metal with surface oxidation | Ti metal is heated at 660° C. to 880° C. in an oxygen atmosphere to form $TiO_2$ on the surface of Ti metal itself. | 0.005 | 0.5 | 800 |
| $TiO_2$ impregnated on alumina | Alumina is impregnated with a $Ti(OC_3H_7)_4$ solution, hydrolyzed and sintered (600° C., 6 hr). | 0.08 | 105 | <10 |
| $TiO_2$ impregnated on sponge Ti | Sponge titanium is impregnated with a $Ti(OC_3H_7)_4$ solution, hydrolyzed and sintered (600° C., 6 hr). | 0.05 | 5 | 800 |

According to this invention, since the adsorbent adsorbs metal ions in high temperature water, in particular, the adsorbent adsorbs selectively transition metal ions including radionuclides such as $^{59}Fe$, $^{54}Mn$, $^{58}Co$, $^{60}Co$, in high temperature water, there is caused no heat loss which is inevitable in the conventional purification process of the water coolant of nuclear reactor wherein the water coolant is once cooled to remove metal ions by adsorption with an adsorbent and is heated again to the reactor coolant temperature. In addition, metal ions such as cobalt ions can be removed effectively by directly contacting a high temperature water coolant with the adsorbent of this invention. Further, since the capacity for purifying the water coolant can be increased accordingly, the radioactivity amount in nuclear reactor can be reduced more remarkably and the exposure to irradiation can be reduced effectively.

What is claimed is:

1. An inorganic adsorbent comprising a porous titanium metal and titanium oxide sintered and impregnated on the surfaces of micropores of said porous titanium metal; said titanium oxide being obtained from a titanium alkoxide of the formula: Ti(OR)$_4$, wherein R is a lower alkyl group.

2. An inorganic adsorbent according to claim 1, wherein the lower alkyl group contains from 1 to 6 carbon atoms.

3. An inorganic adsorbent according to claim 1, wherein the titanium alkoxide is titanium tetraisopropoxide.

4. A process for producing an inorganic adsorbent which comprises
   a step of impregnating a porous titanium metal with a titanium alkoxide solution to attach and hold the titanium alkoxide on micropores of the porous titanium metal,
   a step of hydrolyzing the titanium alkoxide attached and held on the micropores to give hydrous titanium oxide, and
   a step of changing the hydrous titanium oxide to titanium oxide by heating the porous titanium metal holding the hydrous titanium oxide and at the same time sintering and impregnating the resulting titanium oxide on the surfaces of micropores of the porous titanium metal.

5. A process according to claim 4, wherein the titanium alkoxide is represented by the formula: Ti(OR)$_4$, wherein R is a lower alkyl group.

6. A process according to claim 5, wherein the titanium alkoxide is titanium tetraisopropoxide.

7. A process according to claim 4, wherein the hydrolysis is conducted in an atmosphere of water vapor.

8. A process according to claim 4, wherein the hydrolysis is conducted in an atmosphere of ammonia vapor.

9. A process according to claim 4, wherein the hydrolysis is conducted at a temperature of 70° to 80° C.

10. A process according to claim 4, wherein the step of sintering and impregnating titanium oxide is conducted at a temperature of 500° to 700° C.

11. A process for producing an inorganic adsorbent which comprises
    a step of subjecting a porous titanium metal to vacuum extraction,
    a step of impregnating the porous titanium metal with a titanium alkoxide solution to attach and hold the titanium alkoxide on micropores of the porous titanium metal,
    a step of hydrolyzing the titanium alkoxide attached and held on the micropores to give hydrous titanium oxide, and
    a step of changing the hydrous titanium oxide to titanium oxide by heating the porous titanium metal holding the hydrous titanium oxide and at the same time sintering and impregnating the resulting titanium oxide on the surfaces of micropores of porous titanium metal.

12. A process according to claim 11, wherein the titanium alkoxide is titanium tetraisopropoxide.

13. A process according to claim 11, wherein the hydrolysis is conducted in an atmosphere of water vapor.

14. A process according to claim 11, wherein the hydrolysis is conducted in an atmosphere of ammonia vapor.

15. A process according to claim 11, wherein the hydrolysis is conducted at a temperature of 70° to 80° C.

16. A process according to claim 11, wherein the step of sintering and impregnating titanium oxide is conducted at a temperature of 500° to 700° C.

* * * * *